June 9, 1931.   G. HEGLUND   1,809,626
SCOOP FOR POTATO DIGGERS
Filed Dec. 23, 1929
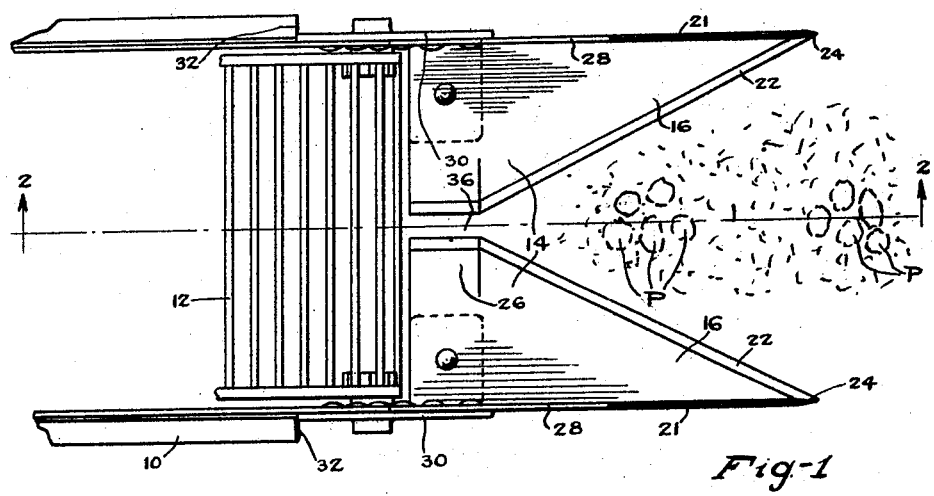
Fig-1
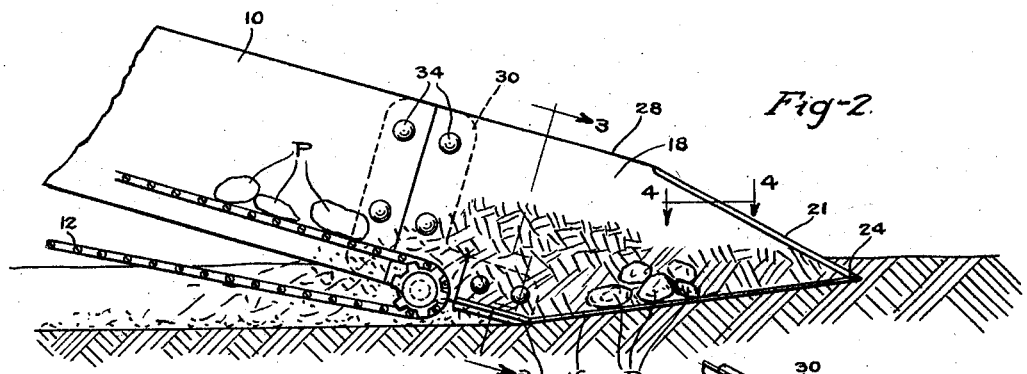
Fig-2
Fig-4
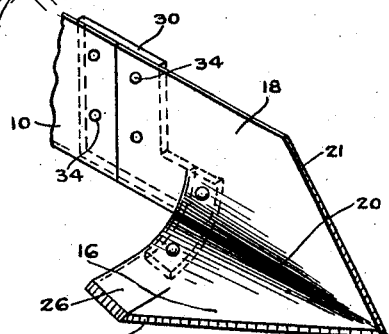
Fig-5
Fig-3
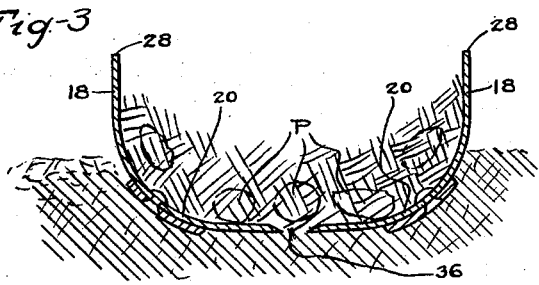
Inventor:
Gust Heglund.
By Whiteley and Ruckman
Attorneys.

Patented June 9, 1931

1,809,626

UNITED STATES PATENT OFFICE

GUST HEGLUND, OF CONSTANCE, MINNESOTA

SCOOP FOR POTATO DIGGERS

Application filed December 23, 1929. Serial No. 416,031.

My invention relates to scoops for potato diggers, and an object is to provide an attachment for such machines for scooping up the potatoes which is so constructed that it is not liable to become clogged with quack-grass, weeds, and muck. Another object is to provide a scoop which will dig up the potatoes without liability of bruising and cutting them. I accomplish the objects of my invention by providing a scoop which consists of two complementary members separated from each other by a central gap which narrows down to a slot at the rear with the edges of the scoop members formed as knife edges so that they will cut through quack-grass, weeds, muck, etc.

The full objects and advantages of my invention will appear in connection with the detailed description thereof, and the novel features of my inventive idea will be particularly pointed out in the claims.

In the accompanying drawings which illustrate a practical embodiment of my invention,—

Fig. 1 is a top plan view of the device. Fig. 2 is a view in longitudinal section on the line 2—2 of Fig. 1. Fig. 3 is a view in transverse section on the line 3—3 of Fig. 2. Fig. 4 is an enlarged view in section on the line 4—4 of Fig. 2. Fig. 5 is a perspective view of one of the scoop members.

Referring to the drawings, the numeral 10 designates the elevator frame of a well known or suitable potato digging machine, this frame supporting a customary endless conveyor 12. The scoop which forms the subject matter of the present application consists of two similar members each of which is designated in general by the numeral 14. Since these two members are alike except that one is left handed and the other right handed, so that the two members are complementary, a detailed description of one of them will serve to make the invention understood. The member 14 has a bottom wall 16 and a side wall 18, these walls merging into each other by means of a curved portion 20 as best shown in Fig. 3. The member 14 will be described particularly with relation to its operative position illustrated in Fig. 2 which shows the device cutting into the ground for the purpose of digging potatoes indicated by the letter P. As shown in Fig. 2, the main and forward part of the side wall 18 is triangular in shape with its upper edge sloping downwardly toward the front and sharpened as indicated at 21. The main portion of the bottom wall 16 is also triangular in shape with its inner edge sharpened as indicated at 22 and inclined outwardly so that the two walls 16 and 18 come to a point 24 where they meet each other at the front. As will be understood from Fig. 1, the two points 24 of the two scoop members are separated from each other to such an extent that they will straddle the hills of potatoes without liability of sticking into the potatoes. As shown in Fig. 2, the bottom wall 16 inclines downwardly toward the rear so that when the edge 22 cuts into the ground adjacent the potatoes, it is far enough below the surface so as not to cut into the potatoes. At the rear of the scoop member, the bottom wall 16 is turned upwardly as indicated at 26. The rear portion of the side wall 18 is inclined upwardly at a lesser angle as indicated at 28 than the inclination of the forward sharpened portion indicated at 21. The portion indicated at 28 is not sharpened and lies in line with the upper edge of the frame member. The rear end of the scoop member as thus defined is secured to a casting 30 which butts against a shoulder 32 near the lower end of the frame 10, this casting being secured to the frame by bolts 34. The cutting edges 22 of the two scoop members do not quite meet each other at the rear but are deflected into longitudinal directions so as to leave a straight-sided opening 36 between them.

The operation and advantages of my invention will be obvious in connection with the foregoing description. The points 24 of the scoop dig into the ground slightly below the surface thereof and the sharp edges 22 cut off the roots of quack-grass, etc. By the time that the cutting edges approach a hill of potatoes, the downward inclination of the bottom walls of the scoop causes the cutting edges 22 to be disposed below the potatoes which are then lifted up by the upward inclination 26 and delivered to the endless conveyor 12. The sharp upper edges 21 of the scoop also cut through quack-grass, etc. and the scoop slides easily through sticky ground such as muck with very little liability to clog from the muck or from quack-grass and weeds.

I claim:

1. A scoop for potato diggers comprising two complementary members, each of said members having a triangular side wall and a triangular bottom wall, the bottom walls sloping downwardly toward the rear and the side walls forming points with the bottom walls at the front of the scoop, the edges of the side walls inclining upwardly and being sharp and the edges of the bottom walls being rearwardly convergent to produce a gap diminishing in width and being sharp.

2. A scoop for potato diggers comprising two complementary members, each of said members having a triangular side wall and a triangular bottom wall, the side walls forming points with the bottom walls at the front of the scoop, the edges of the side walls inclining upwardly and being sharp and the edges of the bottom walls being rearwardly convergent to produce a gap diminishing in width and being sharp.

3. A scoop for potato diggers comprising two complementary members, each of said members having a triangular side wall and a triangular bottom wall, the side walls forming points with the bottom walls at the front of the scoop, the edges of the side walls inclining upwardly and being sharp, and the edges of the bottom walls being rearwardly convergent to produce a gap diminishing in width and being sharp, and narrow upwardly inclined members carried by the rear of said bottom walls, said narrow members being separated by a gap of substantially the same width as the width of the narrowest portion of said first mentioned gap.

In testimony whereof I hereunto affix my signature.

GUST HEGLUND.